(12) United States Patent
Kakishima et al.

(10) Patent No.: US 7,899,458 B2
(45) Date of Patent: Mar. 1, 2011

(54) SYSTEM, METHOD AND APPARATUS FOR CONTROLLING MOBILE TERMINAL HANDOVER

(75) Inventors: Jun Kakishima, Yokohama (JP); Takeshi Ihara, Yokosuka (JP); Shoichi Hirata, Fucyu (JP)

(73) Assignee: NTT DoCoMo, Inc., Tokyo (JP)

( * ) Notice: Subject to any disclaimer, the term of this patent is extended or adjusted under 35 U.S.C. 154(b) by 618 days.

(21) Appl. No.: 11/754,860

(22) Filed: May 29, 2007

(65) Prior Publication Data

US 2007/0224994 A1 Sep. 27, 2007

Related U.S. Application Data

(62) Division of application No. 10/778,106, filed on Feb. 17, 2004, now abandoned.

(30) Foreign Application Priority Data

Feb. 25, 2003 (JP) ................................ 2003-047761

(51) Int. Cl.
*H04W 36/00* (2009.01)
*H04M 1/00* (2006.01)
*H04B 7/00* (2006.01)
(52) U.S. Cl. ......... 455/436; 455/437; 455/441; 455/525; 455/552.1; 370/331; 370/332
(58) Field of Classification Search .............. 455/67.11, 455/67.13, 422.1, 436–445, 448, 456.1, 456.5–456.6, 455/514, 517, 524–525, 550.1, 556.2, 552.1, 455/560–561; 370/342, 236, 328, 331–335, 370/338
See application file for complete search history.

(56) References Cited

U.S. PATENT DOCUMENTS

| 5,697,055 | A |   | 12/1997 | Gilhousen et al. |
| 5,901,145 | A | * | 5/1999 | Sawyer .......................... 370/332 |
| 5,987,013 | A |   | 11/1999 | Kabasawa |
| 6,295,450 | B1 |  | 9/2001 | Lyer et al. |

(Continued)

FOREIGN PATENT DOCUMENTS

CN 1276950 A 12/2000

(Continued)

OTHER PUBLICATIONS

Hesham Soliman, et al., "Hierarchical MIPv6 mobility management," Internet-Draft, draft-ietf-mobiip-hmipv6-03.txt., 2001, pp. 1-25.

*Primary Examiner* — Meless N Zewdu
(74) *Attorney, Agent, or Firm* — Oblon, Spivak, McClelland, Maier & Neustadt, L.L.P.

(57) ABSTRACT

A system for controlling handover is disclosed that includes a mobile terminal that enables communications with multiple wireless systems having wireless access stations, and a handover-controlling apparatus that executes control of handover for the mobile terminal, which travels among multiple types of wireless systems. The mobile terminal includes a destination wireless system determining unit that receives downlink signals from the corresponding wireless access stations so as to determine which wireless system accommodates a destination wireless access station based on reception quality of downlink signals. The mobile terminal also includes a destination wireless system reporting unit that sends information indicating the determined wireless system to the handover-controlling apparatus. The handover-controlling apparatus includes a handover-controlling unit that controls handover operations for the mobile terminal based on the information indicating the determined wireless system, which is sent from the destination wireless system reporting unit.

7 Claims, 7 Drawing Sheets

U.S. PATENT DOCUMENTS

| | | |
|---|---|---|
| 6,301,234 B1 | 10/2001 | Lee |
| 6,611,688 B1 | 8/2003 | Raith |
| 6,826,154 B2 * | 11/2004 | Subbiah et al. ............... 370/236 |
| 6,834,189 B1 | 12/2004 | Forde |
| 7,016,331 B1 * | 3/2006 | Joo et al. ..................... 370/334 |
| 7,313,628 B2 * | 12/2007 | Chaskar et al. ............... 709/238 |
| 2001/0006514 A1 * | 7/2001 | Park .............................. 370/331 |
| 2002/0067707 A1 | 6/2002 | Morales et al. |
| 2002/0172207 A1 * | 11/2002 | Saito et al. ................... 370/400 |
| 2004/0097234 A1 | 5/2004 | Rajkotia et al. |
| 2005/0272428 A1 | 12/2005 | Tanabe et al. |

FOREIGN PATENT DOCUMENTS

| | | |
|---|---|---|
| CN | 1395385 A | 2/2003 |
| EP | 1 199 841 A2 | 4/2002 |
| JP | 2001-169323 | 6/2001 |
| JP | A-2002-190769 | 7/2002 |
| JP | A-2002-199426 | 7/2002 |
| JP | A-2002-291015 | 10/2002 |
| JP | A-2003-47037 | 2/2003 |
| JP | A-2003-47038 | 2/2003 |
| WO | WO 98/52374 | 11/1998 |
| WO | WO 03/003639 A2 | 1/2003 |
| WO | WO 03/003639 A3 | 1/2003 |

* cited by examiner

FIG.7

| USER | AP ADDRESS | AR ADDRESS | WIRELESS QoS PARAMETER (REQUESTED QoS CLASS) | WIRELESS SYSTEM TYPE INFORMATION | WIRELESS QUALITY CONDITION INFORMATION |
|---|---|---|---|---|---|
| USER A | $AP_{LAN}$ | $AR_A$ | .... | .... | .... |
| ⋮ | ⋮ | ⋮ | ⋮ | ⋮ | ⋮ |
| USER X | $AP_{WCDMA}$ | $AR_B$ | .... | .... | .... |
| ⋮ | ⋮ | ⋮ | ⋮ | ⋮ | ⋮ |

SYSTEM, METHOD AND APPARATUS FOR CONTROLLING MOBILE TERMINAL HANDOVER

CROSS-REFERENCE TO RELATED APPLICATIONS

This application is a Divisional of U.S. patent application Ser. No. 10/778,106, filed Feb. 17, 2004, and claims priority to Japanese Patent Application No. 2003-047761, filed Feb. 25, 2003. The entire contents of these applications are incorporated herein by reference.

BACKGROUND OF THE INVENTION

1. Field of the Invention

The present invention generally relates to a system for and its method of controlling handover, a mobile terminal, and an apparatus for controlling handover, and particularly relates to a system for and its method of controlling handover between homogeneous or heterogeneous wireless systems at the network side so as to enable a reduction in the throughput of the mobile terminal.

Furthermore, the present invention relates to the mobile terminal and the apparatus for controlling handover which are used in such a system for controlling handover.

2. Description of the Related Art

In recent years, the Wireless Local Area Network (WLAN) has been spreading rapidly and also has been watched with keen interest as means for connecting to the Internet.

In the WLAN, when changing on the move from one connecting access point to another, the IP address of the mobile terminal changes so that a problem of intermittent data flow arises in a case such as streaming. To this end, as a method of solving this problem, the "Mobile IP" has been proposed. In the Mobile IP, having a home address and an agent address enables the mobile terminal to retain connectivity even when the connecting access point changes from one to another.

Furthermore, although the transmission data rate of the WLAN is higher than that of a mobile telephone network, in order for the WLAN to achieve the same level of ease-of-use as the mobile telephone network, the problem of handover needs to be solved so as to be able to use the WLAN consistently without a break in data communications even when the mobile terminal is on the move. In order to respond to this problem, the Hierarchical Mobile IP (HMIP) which is based on the Mobile IP has been proposed. This HMIP enables the enhancement in the speed of handover as registration at the home agent is not performed every time a location is registered. More specifically, a server called the Mobility Anchor Point (MAP) having a function similar to that of the home agent is provided within a foreign network, and the location information is registered within the MAP so as to implement the enhancement in the handover speed.

Non-Patent Document 1

Hesham Soliman, Claude Castelluccia, Karim El-Malki, Ludovic Bellier, "Hierarchical MIPv6 mobility management", Internet draft, draft-ietf-mobileip-hmipv6-03.txt., 2001

However, as seen in the HMIP described above, in the handover using the WLAN, the terminal itself needs to designate a route in the network. An IP (Internet Protocol)-centric network (the so-called IP network) is layered so that the own layer number and the IP address are provided as broadcast information to the terminal. At the terminal side, its own optimal route (which does not produce redundant routes) is determined using the broadcast information.

Now it is expected that, in the next generation mobile telephone system which follows the current mobile telephone system, a wide variety of wireless systems including the mobile telephone and the WLAN systems will be interconnected via the IP network. For example, in the case of accommodating such a wide variety of wireless systems in a common IP network, the development of handover technology to seamlessly connect the wide variety of wireless systems in response to the location and the taste of the user, the communications content, etc., will become quite important.

Furthermore, at the terminal side, although study on a software-defined radio that enables the handling of a variety of wireless methods and protocols is underway, it is expected that the amount of processing at the terminal side will increase in order to achieve such greater functionality. Therefore, if the HMIP of the Mobile IP as described above is implemented as it is in the software-defined radio, a problem arises such that there will be a further increase in the amount of processing at the terminal so as to make minituarization difficult.

SUMMARY OF THE INVENTION

It is a general object of the present invention to provide a system for and its method of controlling handover, a mobile terminal, and an apparatus for controlling handover that substantially obviate one or more problems caused by the limitations and disadvantages of the related art.

In light of the problems as described above, it is a more particular object of the present invention to provide a system for and its method of controlling handover between homogeneous or heterogeneous wireless systems at the network side so as to enable the seamless implementation of handover between homogeneous or heterogeneous wireless systems while seeking a reduction in the amount of processing at the mobile terminal for controlling handover in the case of accommodating multiple types of wireless networks in the common network.

Furthermore, the present invention relates to the mobile terminal and the apparatus for controlling handover which are used in such a system for controlling handover.

According to the invention, a system for controlling handover includes a mobile terminal which enables communication with a plurality of wireless systems having wireless access stations, and a handover-controlling apparatus which executes control of handover for the mobile terminal which travels among a plurality of types of the wireless systems, wherein the mobile terminal includes a destination wireless system determining unit which receives downlink signals from the respective wireless access stations so as to determine a wireless system which accommodates a destination wireless access station based on reception quality of the downlink signals, and a destination wireless system reporting unit which sends information indicating said determined wireless system to said handover-controlling apparatus, and said handover-controlling apparatus includes a handover-controlling unit which controls handover operations for said mobile terminal based on the information indicating the wireless system which is sent from said destination wireless system reporting unit.

The system for controlling handover as described above enables the reduction of handover control processing at the mobile terminal side as the apparatus for controlling handover at the network side selects the handover method which fulfills the request of the mobile terminal based on the wireless system type information which is provided from the mobile terminal. This enables the simplification of said apparatus even in such a case as a software-defined radio in which the mobile terminal is enabled to conduct communications with the wireless systems.

According to another aspect of the invention, an apparatus for controlling handover which executes control of handover for a mobile terminal that travels among a plurality of types of wireless systems includes a handover-controlling unit which controls handover operations for said mobile terminal based on the information indicating a wireless system which is sent from said mobile terminal.

The apparatus for controlling handover as described above enables the reduction of handover control processing at the mobile terminal side as said apparatus at the network side selects the handover method which fulfills the request of the mobile terminal based on the wireless system type information which is provided from the mobile terminal.

According to another aspect of the invention, a mobile terminal enables communication with a plurality of wireless systems having wireless access stations and the handover to a plurality of types of the wireless systems includes a destination wireless system determining unit which receives downlink signals from respective wireless access stations so as to determine the wireless system which accommodates the destination wireless access station based on the reception quality of the received downlink signals, and a destination wireless system reporting unit which sends to said apparatus at the network side the information indicating said determined wireless system.

The mobile terminal as described above enables the reduction of handover control processing at said terminal side as the apparatus for controlling handover at the network side selects the handover method which fulfills the request of said terminal based on the wireless system type information which is provided from said terminal. This enables the simplification of the apparatus even in such a case as a software-defined radio in which said terminal is enabled to conduct communications with the wireless systems.

According to another aspect of the invention, a method of controlling handover in the system for controlling handover which includes the mobile terminal that enables the communication with the plurality of wireless systems having wireless access stations and the apparatus for controlling handover that executes control of handover for said mobile terminal that travels among the plurality of types of wireless systems, said method including the steps of receiving, at said mobile terminal, the downlink signals from the respective wireless access stations so as to determine the wireless system which accommodates the destination wireless access station based on the reception quality of the received downlink signals and sending, from said mobile terminal, information indicating said determined wireless system to said apparatus for controlling handover, and controlling, by said apparatus, handover operations for said mobile terminal based on the information indicating said reported wireless system.

The method of controlling handover as described above enables the reduction of handover control processing at the mobile terminal side as the apparatus for controlling handover at the network side selects the handover method which fulfills the request of the mobile terminal based on the wireless system type information which is provided from the mobile terminal. This enables the simplification of the apparatus even in such a case as a software-defined radio in which the mobile terminal is enabled to conduct communications with the wireless systems.

Other objects and further features of the present invention will be apparent from the following detailed description when read in conjunction with the accompanying drawings.

BRIEF DESCRIPTION OF THE DRAWINGS

FIG. 7 is a table which illustrates an exemplary structure of an AP-AR management database.

DETAILED DESCRIPTION OF THE PREFERRED EMBODIMENTS

In the following, embodiments of the present invention are described with reference to the accompanying drawings.

Figure 1:
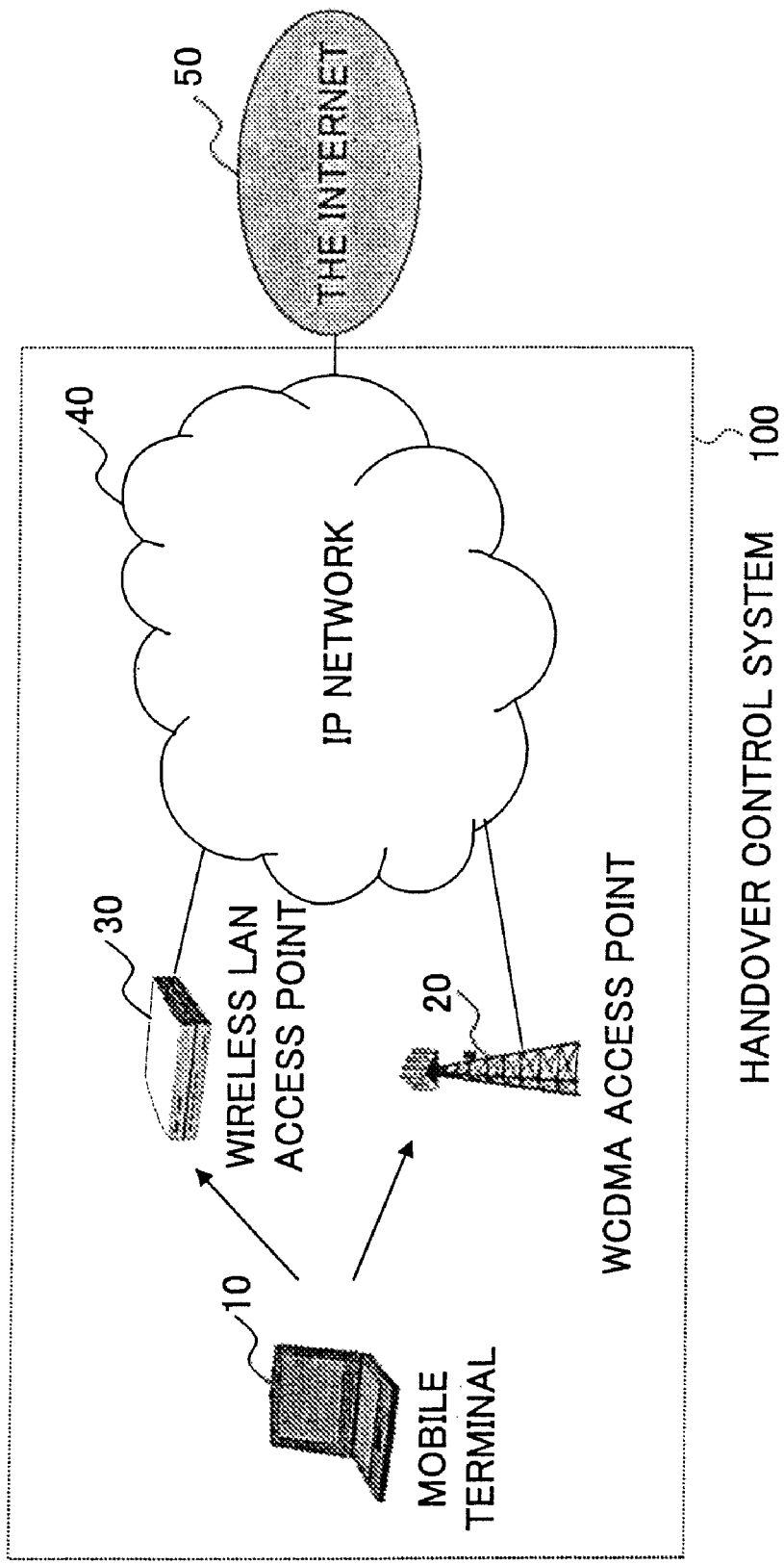
FIG. 1 is a block diagram of a system for controlling handover which is concerned with a working form of the invention.

FIG. 1 is a block diagram of a system for controlling handover which is concerned with a working form of the invention.

In FIG. 1, this handover control system 100 comprises a WCDMA (Wideband Code Division Multiple Access)/WLAN multi-functional wireless communications terminal (hereinafter abbreviated as the mobile terminal) 10 which handles both the WCDMA method based on the IMT-2000 standards specifications and the WLAN method, a WCDMA access point 20 (for example, a wireless base station), a WLAN access point 30, and an IP network 40, the mobile terminal 10 being enabled for connection to the Internet 50 via the IP network 40.

Figure 2:
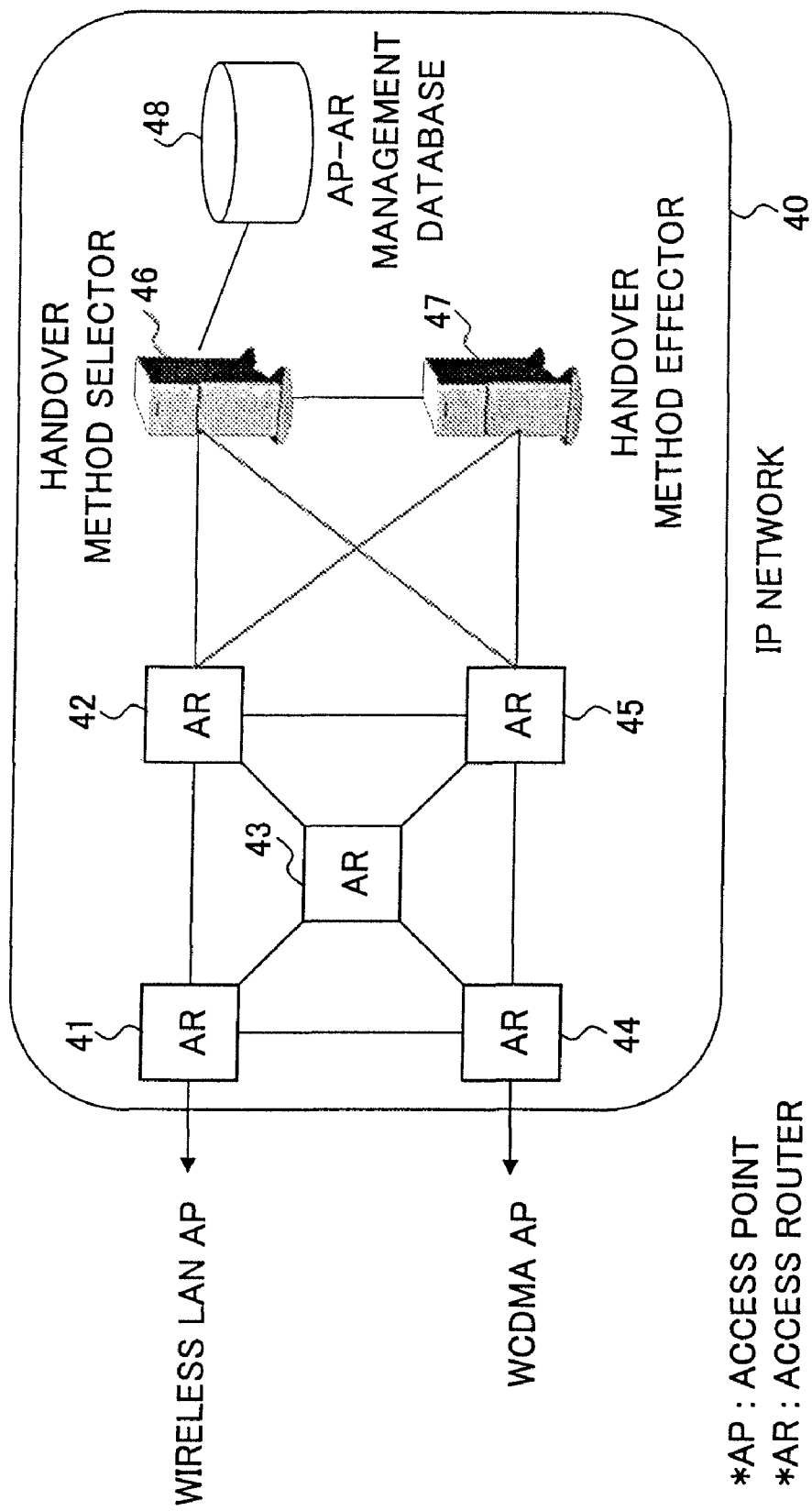
FIG. 2 is a block diagram of an IP network as illustrated in FIG. 1.

FIG. 2 is a block diagram of the IP network 40 which is illustrated in FIG. 1.

In FIG. 2, this IP network 40 comprises access routers 41 through 45 which connect to the WLAN access point 30 and the WCDMA access point 40, a handover method selector 46, a handover method effector 47, and a database 48 which manages the corresponding relationships between the access routers and the access points (or an AP-AR management database).

The handover method selector 46 refers to the AP-AR management database 48 based on the information provided from the mobile terminal 10 so as to select an optimal handover method and notifies the handover method effector 47 of the selection. The handover method effector 47 performs the handover processing according to the handover method as provided from the handover method selector 46. The specific processing procedures are described below.

Figure 3:
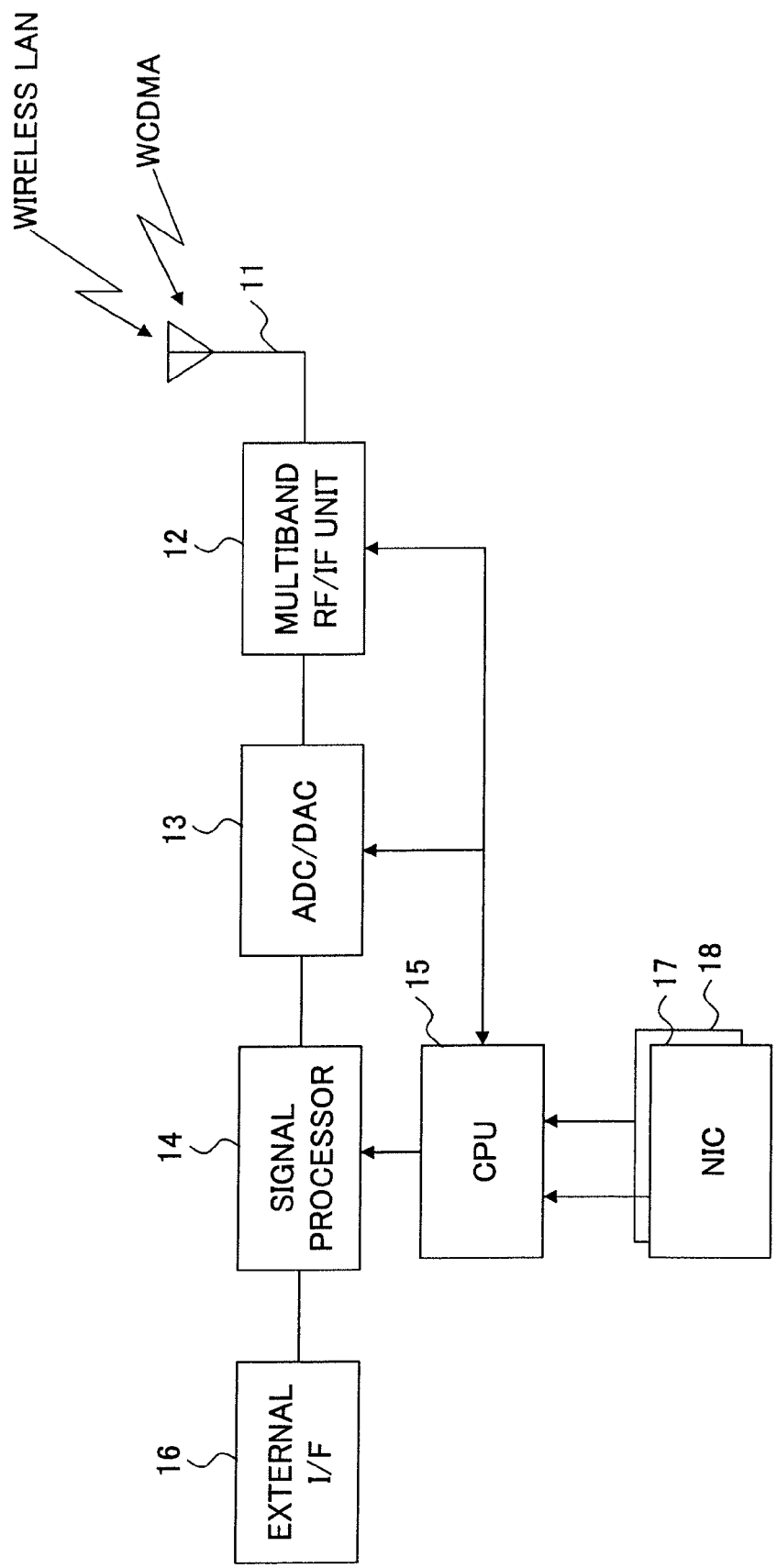
FIG. 3 is a block diagram of a mobile terminal as illustrated in FIG. 1.

FIG. 3 is a block diagram of a mobile terminal 10 as illustrated in FIG. 1.

In FIG. 3, this mobile terminal 10 comprises an antenna 11 which receives a WCDMA wireless or a WLAN wireless signal, a multi-band RF/IF unit 12 which switches to a filter that is relevant to the corresponding wireless methods of said received signal so as to convert the wireless signal to an IF signal, an ADC (Analog-to-Digital Converter) and DAC (Digital-to-Analog Converter) 13 which performs conversion processing between an analog IF signal and a digital IF signal, a signal processor 14 which performs signal processing that is relevant to the method (for example, despreading processing, modulation/demodulation processing), an external interface unit 16 which is provided with an interface function for outputting to an external Ethernet (a registered trademark), etc., the output received from the signal processor 14, a Central Processing Unit (CPU) 15 which is in charge of controlling the overall system and determines a destination wireless system based on the received input signal output from the multi-band RF/IF unit 12, and the network interface cards (NICs) 17 and 18 which accommodate, for example, the communications protocols for performing wireless connections according to said corresponding wireless methods.

The mobile terminal 10 as described above comprises, for example, a software-defined radio which enables the operation, by downloading to the multi-band RF/IF unit 12, the ADC and DAC 13, and the signal processor 14, the software of the communications method accommodated in NIC 17 or NIC 18, as an apparatus at the terminal side for the corresponding methods. Besides, the software of the corresponding methods may be accommodated in one NIC, or one NIC may be provided per wireless method. In the present embodiment, a NIC is provided per wireless method so that a WLAN NIC 17 and a WCDMA NIC 18 are implemented in the mobile terminal 10.

Besides, the example described above is an example in which the NIC and the antenna 11 are separately configured, but there may be a case in which a NIC includes an antenna. In such a case, such antenna serves the function of the antenna 11 as described above.

Figure 4:
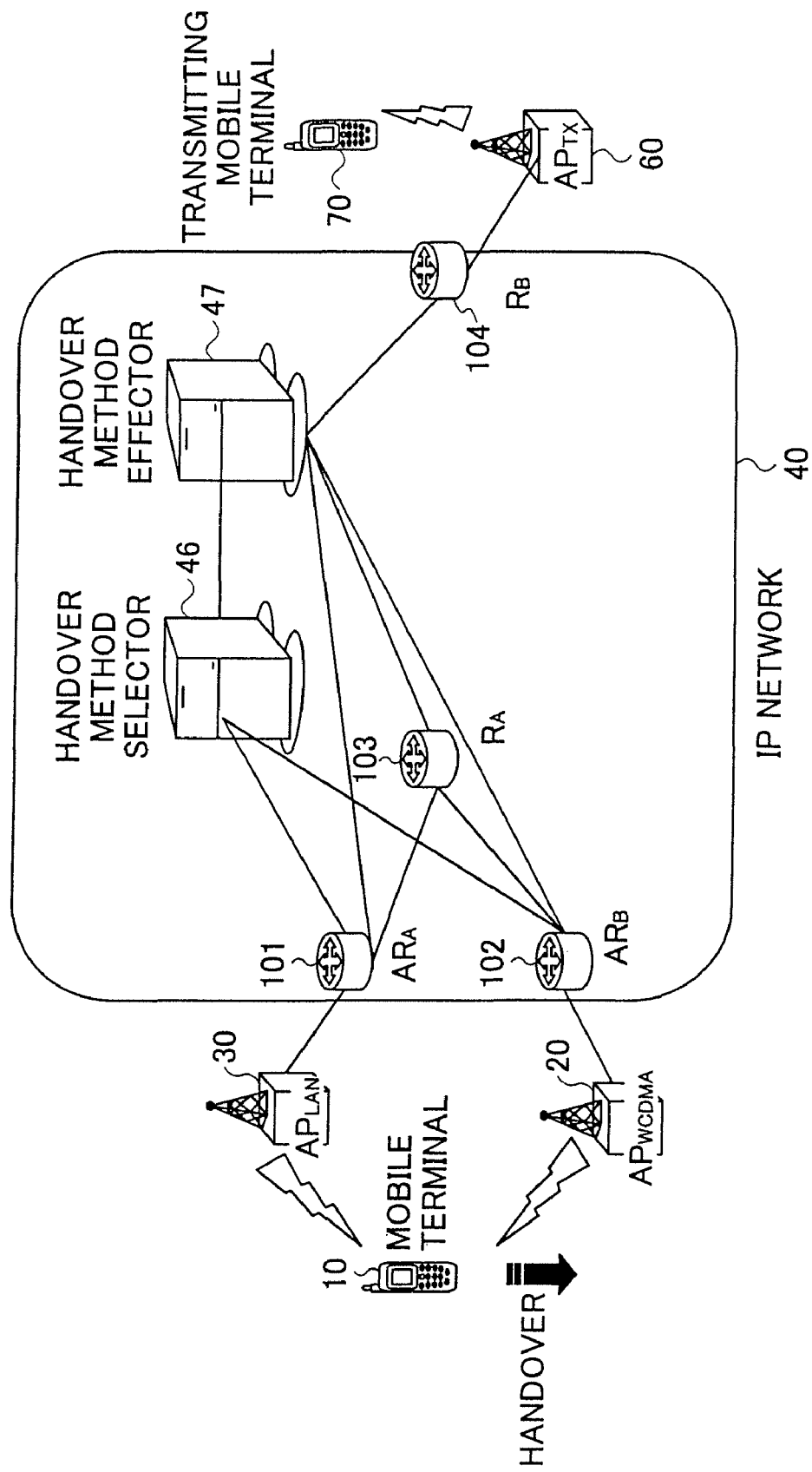
FIG. 4 is a schematic diagram which illustrates a state of communications for describing handover operations of a system for controlling handover according to the working form of the invention.
Figure 5:
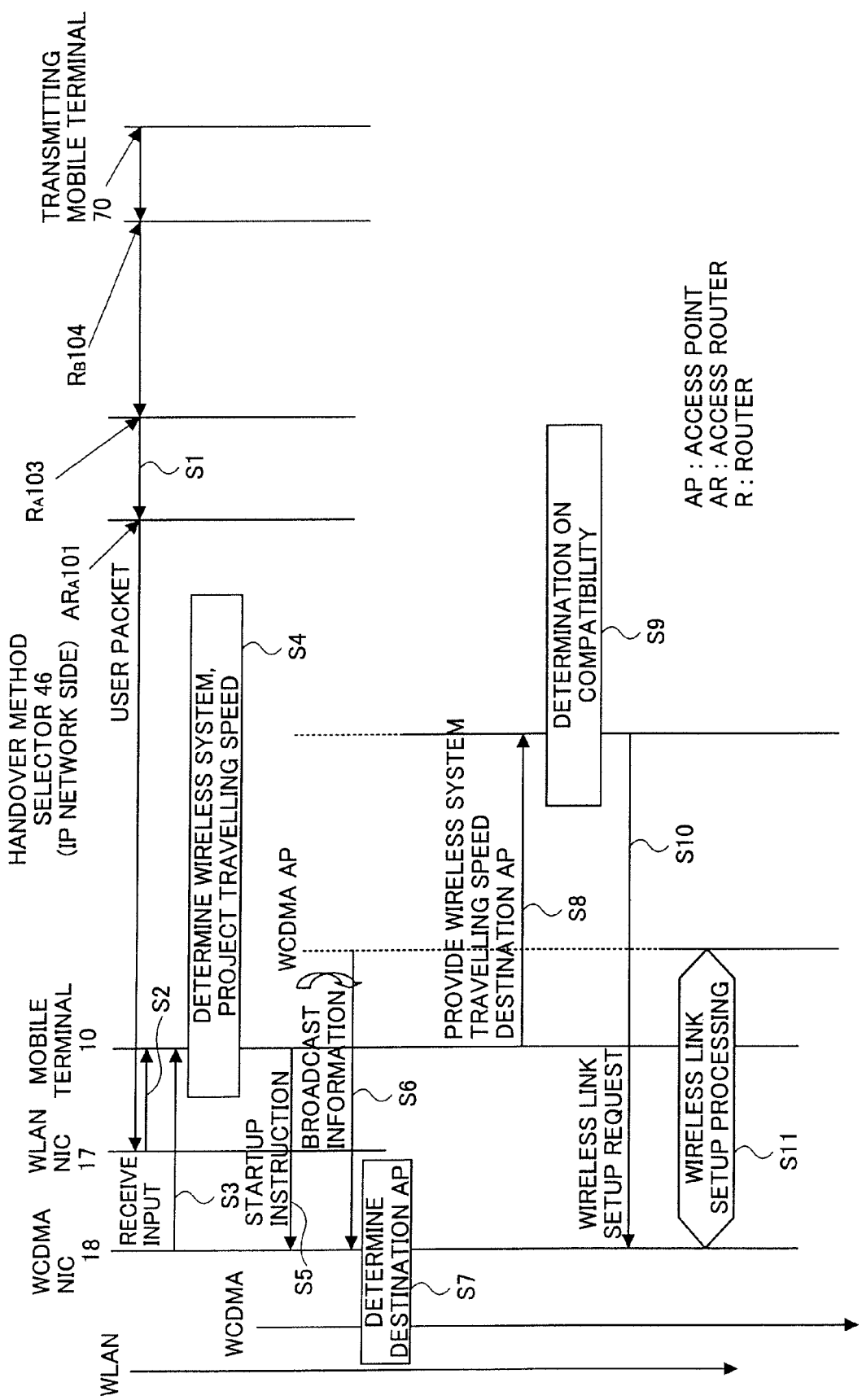
FIG. 5 is the first part of a sequence diagram which illustrates handover operations of a system for controlling handover according to the working form of the invention.
Figure 6:
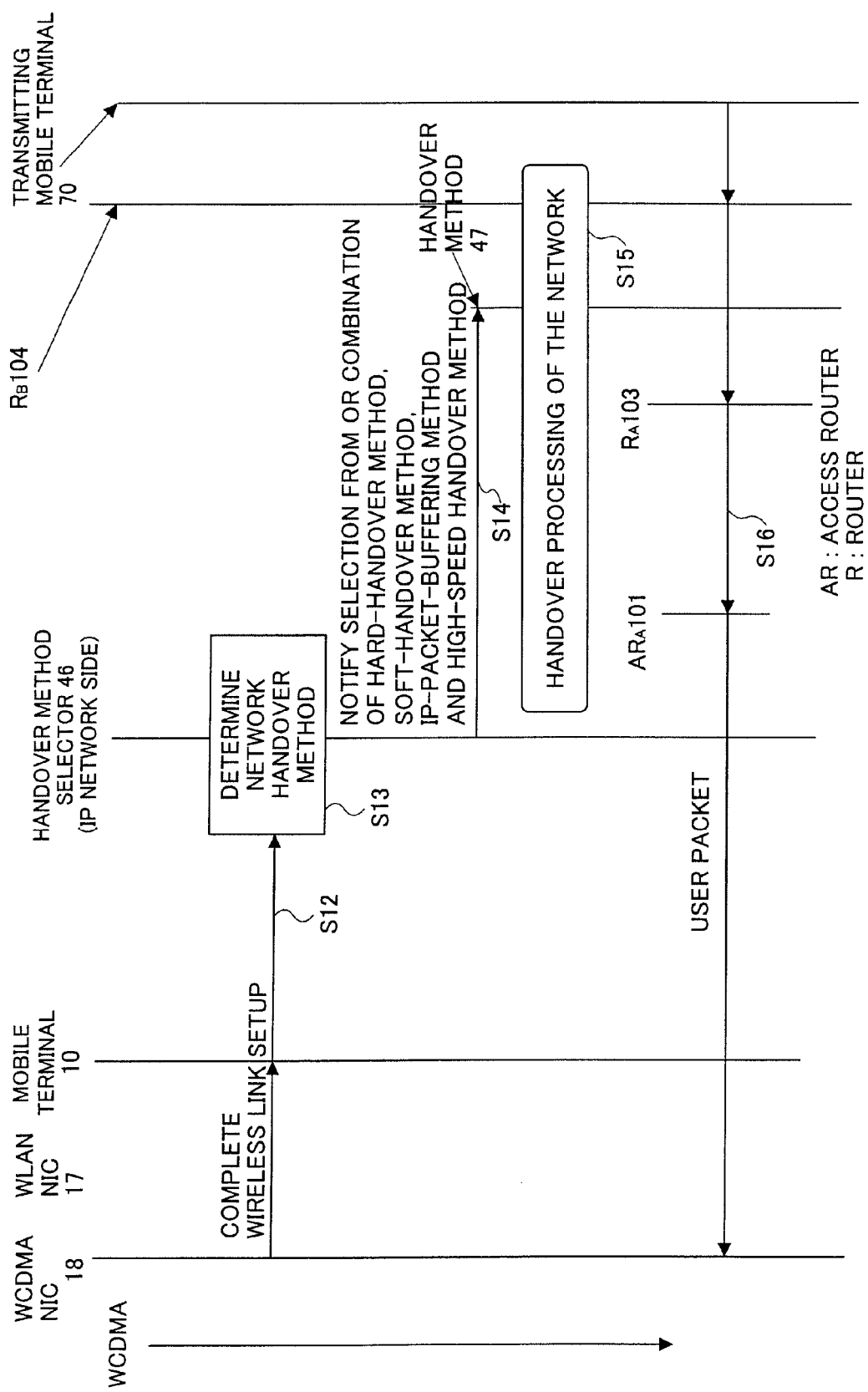
FIG. 6 is the second part of the sequence diagram which illustrates handover operations of a system for controlling handover according to the working form of the invention.

Referring to FIG. 4 through FIG. 6, the handover operations of the system for controlling handover which is configured as described above are described.

FIG. 4 is a diagram which illustrates a state of communications so as to describe the handover operations of a system for controlling handover according to a working form of the invention.

FIG. 5 and FIG. 6 are sequence diagrams which illustrate the handover operations of a system for controlling handover according to a working form of the invention.

In FIG. 4, the example is intended to represent a case in which the mobile terminal 10 is located in the vicinity of the boundary between a wireless zone that comprises a WLAN access point AP-LAN 30 and a wireless zone that comprises a WCDMA access point AP-WCDMA 20 and in which the mobile terminal 10 is seeking a handover from a WLAN wireless system to a WCDMA wireless system.

Moreover, taking an access router that is proximate to the WLAN access point AP-LAN 30 as AR-A 101 and an access router that is proximate to the WCDMA access point AP-WCDMA 20 as AR-B 102, the access routers AR-A 101 and AR-B 102 are connected to a router R-A 103, the handover method selector 46, and the handover method effector 47 so as to form the respective communications routes. Furthermore, a transmitting mobile terminal 70 which transmits a packet to the mobile terminal 10 conducts wireless communications with an access point AP-TX 60 which is currently communicating so that a packet which is received at the AP-TX 60 is transferred via a proximate router R-B 104.

Now referring to FIG. 5 and FIG. 6, the handover operations of a system for controlling handover according to a working form of the invention are described in detail.

A user packet which is transmitted at the transmitting mobile terminal 70 is received at the wireless system access point AP-TX 60 and then is sequentially transferred in the order of R-B 104, R-A 103, AR-A 101, and AP-LAN 30 so as to be converted to a wireless signal at the AP-LAN 30 and sent to the mobile terminal 10 (S1). The wireless signal which transmits said user packet is input to the multi-band RF/IF unit 12 of the mobile terminal 10, which measures the received input value. The measured value is converted to a predetermined signal format at the W-LAN NIC 17 so as to be sent to the CPU 15. Furthermore, as the mobile terminal 10 is then in the vicinity of the boundary of the wireless zone which comprises the WCDMA access point AP-WCDMA 20, the wireless signal which is being transmitted from said AP-WCDMA 20 is also received. Therefore, as described above, the measurement result of the received input of the wireless signal which is transmitted from AP-WCDMA 20 is also sent to the CPU 15 (S3).

The CPU 15 of the mobile terminal 10 compares the received input value from AP-LAN 30 and that from AP-WCDMA 20 so as to determine the wireless system with the higher received input value as the destination wireless system. Here it is assumed that the WCDMA wireless system is determined as the destination wireless system. Also, then, the CPU 15 detects a change in the respective received inputs at AP-LAN 30 and at AP-WCDMA 20 so as to estimate from said detected amount of change the travelling speed of the mobile terminal 10. For example, the Doppler velocity is calculated based on the distribution of the received power so as to assume the Doppler velocity as the travelling speed of the mobile terminal (S4)

The CPU 15, as described above, determines the WCDMA wireless system as the destination wireless system and, when the projection of the travelling speed is completed, a startup instruction which triggers the startup of WCDMA wireless communications is output to NIC 17 (S5) Upon receiving this startup instruction, the WCDMA NIC 18 outputs and sets up at the signal processor 14, the ADC/DAC 13, and the multi-band RF/IF unit 12, the software in which various parameters (such as modulation parameters) for receiving the WCDMA wireless signal are stated so as to enable the reception of the broadcast information which is periodically broadcast from the AP-WCDMA 20. This broadcast information is received at the CPU 15 via the multi-band RF/IF unit 12, the ADC/DAC 13 and the signal processor 14 (S6), said CPU 15 determining the destination access point (hereinafter abbreviated as the destination AP) according to the address information of the access router which is included in this broadcast information (in this case, determined as AR-B 102) (S7).

The CPU 15 outputs to the signal processor 14 the information of the destination AP which is determined in said manner (1), the travelling speed information of the mobile terminal 10 which is previously predicted (2) and the information on the wireless communications system previously determined (to be called the wireless system type information (3)). A set of information items comprising (1), (2) and (3) as described above which is input to the signal processor 14, after undergoing modulation processing, etc., is converted to an analog signal at the DAC portion of the ADC/DAC 13 and then is converted to a wireless signal at the multi-band RF/IF unit 12 so as to be transmitted to the AP-WCDMA 20. Subsequently, the information set is sent to the handover method selector 46 via the AR-B 102 within the IP network 40 (S8).

The handover method selector 46, upon receiving the set of information items (1), (2) and (3), or the destination AP information, the speed information of the mobile terminal 10, and the wireless system type information, accesses the AP- AR management database 48 so as to determine whether the access router which is in the proximity of the destination access point differs from the access router which is in the proximity of the access point prior to travelling (in this case, referred to as the determination on the compatibility of the access routers) (S9).

More specifically, the compatibility of the access routers is determined as described below. FIG. 7 is a table which illustrates an exemplary structure of the AP-AR management database. This AP-AR management database is a database for registering and/or inquiring about the corresponding relationships between the access points and the access routers per user and may be a database server, for example.

In FIG. 7, this AP-AR management database 48 manages per user the Access Point address (the AP address), the Access Router address (the AR address), the wireless QoS parameter which corresponds to the required QoS class, the wireless system type information and the wireless quality condition information.

Hereupon, it is assumed that a user A of the mobile terminal 10 is currently conducting wireless communications with the AP-LAN 30 so as to transfer a user packet via AR-A 101. Therefore, in the AP-AR management database 48, the AP-LAN 30 address as the AP address for the user A and the AR-A 101 address as the AR address are registered.

The handover method selector 46, upon receiving the wireless system type information and the notification of AP-WCDMA 20 as the destination AP, refers to the AP-AR management database 48 so as to retrieve the AP address which corresponds to the AP address of the AP-WCDMA 20, the destination access point. In this example, the fact that the AR address which corresponds to the AP address of the AP-WCDMA 20 is AR-B 102 may be determined from the same database. In this connection, this AR-B 102 is used for transferring the user packet from the mobile terminal of a certain user x.

The handover method selector 46 upon identifying the destination access router as described above determines whether this destination access router and the access router prior to travelling are compatible.

As described below, there are, for example, two methods of determining this compatibility of access routers.

Method 1

Method 1 is a method which corresponds to a handover between heterogeneous wireless systems in which the compatibility of the access routers is determined based on the wireless system type information. For example, in the example as described above, the wireless system type information of AR-A 101 and the wireless system type information of AR-B 102 are compared so as to determine whether there is compatibility of the access points in the case that the types are different.

Method 2

Method 2 is a method which corresponds to a handover between homogeneous wireless systems in which a prefix is set up per access router so as to determine whether there is compatibility of the access routers in the case that the prefixes are different.

The handover method selector 46, upon completing the determination of the compatibility of the access routers as described above, transmits to the mobile terminal 10 a request for setting up a WCDMA wireless link (S10). Thereafter, a predetermined process to set up a wireless link between the AP-WCDMA 20 and the mobile terminal 10 is executed (S11) so that a wireless link setup completion notification is sent from the mobile terminal 10 to the handover method selector 46 upon completing this setup process.

The handover method selector 46, upon receiving the wireless link set-up completion notification (S12), determines a handover method based on the wireless characteristics of the destination wireless system (S13). More specifically, a network method is selected (or a handover algorithm is determined) based on the wireless system type information sent from the mobile terminal 10, and then a determination is made as to whether a high-speed handover is to be performed based on the information of the travelling speed of the mobile terminal.

Selection of Handover Method

The handover method selector 46 selects a handover algorithm based on the destination wireless system according to the criteria as described below.

Selection Criteria of Handover Method (1) In the case of WCDMA: the soft-handover method (2) In the case of HSDPA (High Speed Downlink Packet Access), an enhanced WCDMA method: the IP-packet-buffering method (3) In the case of WLAN: the IP-packet-buffering method (4) In the case of PDC (Personal Digital Cellular): the hard-handover method Below, the respective handover methods as listed above according to an embodiment of the invention are described.

The soft-handover method of (1) refers to a method in which the same packet is sent at the time of handover to the router of the destination and the router prior to travelling.

The IP-packet-buffering method of (2) and (3) refers to a method in which an IP packet is buffered temporarily at the time of handover, the buffering being completed at the time the mobile terminal changes over to the destination router.

The hard-handover method of (4) refers to a method in which at the time of handover a routing cache table is newly created while the routing cache table of the router prior to travelling is deleted.

In the case of the present embodiment, since WCDMA is selected as the destination wireless system based on the wireless system type information, the soft-handover method (1) is selected.

Then, the handover method selector 46 selects whether a high-speed handover is to be performed based on the criteria as described below.

| Selection Criteria of High-speed Handover | |
| --- | --- |
| Speed of terminal 10 | High-speed handover selection |
| High speed | Required |
| Medium speed | Not required |
| Low speed | Not required |

Herein, the high-speed handover method refers to a method in which the signaling procedure (referring to a signal procedure to set up a communications channel with the other party before starting communications and to carry out the connection with the other party) of the wireless link is simplified, or to multicasting to the candidate destination routers at the network side, in order to enable, at the time the mobile terminal 10 is travelling at high speed, the accomplishment of the handover for the mobile terminal.

Based on the travelling speed information from the mobile terminal 10, the handover method selector 46 selects the high-speed handover method in the case where the mobile terminal 10 is determined to be travelling at high speed while the high-speed handover method is not selected in the cases where the mobile terminal 10 is determined to be travelling at either low speed or medium speed.

As described above, the handover method selector 46 selects a handover method according to the type of the wireless system and determines whether the high-speed handover method is required so that the result (for example, a combination of the handover method and a determination as to whether the high-speed handover method is required) is provided to the handover method effector 47 (S14). The handover effector 47 performs processing for the mobile terminal 10 to make the handover based on the provided result (S15). More specifically, the handover method effector 47 transfers the user packet which is transmitted from the transmitting mobile terminal 70 to AP-WCDMA 20 and an access point which neighbors said AP-WCDMA (tentatively referred to herein as the AP-WCDMA 2) via R-A 103 and AR-B 102 (S16). In the case where the mobile terminal 10 is located in the vicinity of the boundary of the wireless zones comprising the respective access points, the mobile terminal 10 receives and modulates the user packets which are transmitted from the respective access points. Furthermore, the mobile terminal 10, in the case where the terminal is not located in the vicinity of the boundary, receives and modulates the user packet which is received from either access point. Besides, in the case that the handover method selector 46 determines that the high-speed handover method is required, a further transfer of the user packet is performed, omitting the signaling procedure as described above.

As described above, according to the present working form, the handover method selector 46 at the network side selects a handover method which fulfills the requirement of the mobile terminal 10 based on the destination AP information, the wireless system type information and the travelling speed information which are provided by the mobile terminal 10 so that the selection of the handover method at the side of the mobile terminal 10 is not required. In other words, the identification of the handover method at the mobile terminal 10 is not required so as to enable a reduction in the amount of handover control processing at the mobile terminal. Therefore, even in the case of the mobile terminal 10 in which the handover between homogeneous or heterogeneous wireless systems is implemented by a software-defined radio, the configuration of the apparatus at the mobile side does not become complex, enabling the simplification of the apparatus.

Although the embodiment describes an example in which the handover method selector 46 and the handover method effector 47 are configured separately, they do not necessarily have to be set up separately and may be configured in one server unit which includes both functions.

Moreover, although the embodiment describes a case in which the handover method selector 46 selects the handover method based on the wireless system type information which is received from the mobile terminal 10, the present invention is not limited to that case. For example, it may take a form in which the mobile terminal 10 monitors the wireless link quality conditions prior to and after travelling, and the monitoring results are provided to the handover method selector 46 at the network side so that the selector selects the handover method based on the wireless link quality conditions. In this case, the mobile terminal 10 calculates the BER (Bit Error Rate) or the S/N (Signal-to-Noise ratio) using the received inputs from the access point prior to travelling (the WLAN system in the case of the present embodiment) and the access point after travelling (the WCDMA system in the case of the present embodiment) so as to provide the calculation results as the wireless link quality conditions to the handover method selector 46 at the network side. The handover method selector 46 performs the selection of the handover method according to the criteria as described below:

| Wireless link quality conditions | Handover method before/after travelling |
| --- | --- |
| Good/good | Hard-handover method |
| Good/bad | Soft-handover method |
| Bad/good | IP-packet-buffering method |
| Bad/bad | Soft-handover method |

For example, in the case such that the BER is good before travelling and bad after travelling, the soft-handover method in which the packets are sent from two or more access points is selected as the handover method to obtain a predetermined reception quality. This enables the execution of handover without degrading the reception quality at the mobile terminal 10.

Moreover, although the AP-AR management database 48 in the embodiment described above assumes a database server which is connected externally to the handover method selector 46, the configuration is not limited to this form, but may take, for example, a form such that the functions of the AP-AR management database 48 are provided within the handover method selector 46.

Furthermore, although the example as described thus far indicates a case in which communications with multiple wireless systems is enabled by having the mobile terminal 10 either to switch NICs which store the respective wireless system communications protocols or to implement multiple NICs, the present invention is not limited to this form. For example, it may take a form in which the software which is stored in the NICs is downloaded from a server, etc., that is provided externally. In such a case, as the software in which a wireless protocol most suitable for the location as stated is automatically downloaded to the mobile terminal 10, the user of the mobile terminal 10 does not have to keep possession of multiple NICs, thus improving the ease-of-use for the user. Also, although the embodiment describes a case in which the mobile terminal 10 is a multi-functional WCDMA/WLAN terminal which handles both WCDMA and WLAN communications methods, it is possible as a matter of course to apply to the present invention a multi-functional terminal which handles more than two types of wireless systems.

What is claimed is:

1. A system for controlling handover, said system comprising:
   a mobile terminal which enables communication with a plurality of wireless systems having wireless access stations; and
   a handover-controlling apparatus which executes control of handover for said mobile terminal which travels among a plurality of types of the wireless systems;
   said mobile terminal including:
      a destination wireless system determining unit which receives downlink signals from two or more of the wireless access stations to determine which of the plurality of corresponding wireless systems accommodates a destination wireless access station based on reception quality of the downlink signals;

a destination wireless system reporting unit which sends information indicating said determined wireless system to said handover-controlling apparatus;

a travelling speed projecting unit which projects a travelling speed of the mobile terminal based on received power characteristics of the downlink signals from the two or more wireless access stations;

a travelling speed reporting unit which sends information indicating said projected travelling speed of the mobile terminal to said handover-controlling apparatus, and said handover-controlling apparatus controls handover operations for said mobile terminal based on the information indicating the determined wireless system which is sent from said destination wireless system reporting unit;

wherein said handover-controlling apparatus is connected to the two or more wireless access stations via a plurality of connecting access routers;

said handover-controlling apparatus including:
  a database which manages corresponding relationships between said wireless access stations and said access routers; and
  a router compatibility determination unit which makes a determination by referring to said database, at a time the information indicating the wireless system which accommodates said destination wireless access station is reported, as to whether the access router which is connected to the destination wireless access station differs from the access router which is connected to a currently connecting wireless access station.

2. The system for controlling handover as claimed in claim 1,
  wherein
  said handover-controlling apparatus further includes:
  a handover method determining unit which determines a handover method based on the wireless system which accommodates the destination wireless access station in the case that said determination is affirmative; and
  a handover processing executing unit which executes handover processing based on said determined handover method.

3. An apparatus for controlling handover which executes control of the handover for a mobile terminal that travels among a plurality of types of wireless systems, said apparatus connected to corresponding wireless access stations within said wireless systems via connecting access routers,
  said apparatus controls handover operations for said mobile terminal based on information indicating a wireless system which is sent from said mobile terminal, said apparatus comprising:
  a database which manages corresponding relationships between said wireless access stations and said access routers;
  a router compatibility determination unit which makes a determination by referring to said database at a time that said information indicating the wireless system which accommodates a destination wireless access station is reported, as to whether the access router which is connected to the destination wireless access station differs from the access router which is connected to a currently connecting wireless access station;
  a handover method determining unit which determines a handover method based on the wireless system which accommodates the destination wireless access station in the case that said determination is affirmative; and
  a handover processing executing unit which executes the handover processing based on said determined handover method;

wherein said handover method determining unit further includes:
  a handover method selecting unit which determines, based on travelling speed information of the mobile terminal which is reported by a travelling speed information reporting unit, whether the handover of said mobile terminal is executed by a high-speed handover method;
  a high-speed handover method selection reporting unit which reports said determination result to said handover processing executing unit; and
  said handover processing executing unit further includes a high-speed handover method executing unit which executes the high-speed handover method in response to said reported determination result.

4. The apparatus for controlling handover as claimed in claim 3,
  wherein said handover method determining unit determines one of a hard-handover method, a soft-handover method, and an IP-packet-buffering method as the handover method based on the wireless system which accommodates the destination wireless access station.

5. A mobile terminal which enables communication with a plurality of wireless systems having wireless access stations and handover to a plurality of types of the wireless systems, said mobile terminal comprising:
  a destination wireless system determining unit which receives downlink signals from two or more of the wireless access stations so as to determine which of the corresponding wireless systems accommodates a destination wireless access station based on a reception quality of the received downlink signals; and
  a destination wireless system reporting unit which sends to an apparatus for controlling handover at a network side information indicating said determined wireless system;
  a travelling speed projecting unit which projects a travelling speed of the mobile terminal based on received power characteristics of the downlink signals from the two or more wireless access stations; and
  a travelling speed information reporting unit which sends information indicating said projected travelling speed of said mobile terminal to the apparatus for controlling the handover which executes control of handover for said mobile terminal travelling among the plurality of types of wireless systems wherein:
  said apparatus for controlling handover is connected to corresponding wireless access stations within said wireless systems via connecting access routers; and
  said apparatus for controlling handover including:
    a database which manages corresponding relationships between said wireless access stations and said access routers; and
    a router compatibility determination unit which makes a determination by referring to said database, at a time the information indicating the wireless system which accommodates said destination wireless access station is reported, as to whether the access router which is connected to the destination wireless access station differs from the access router which is connected to a currently connecting wireless access station.

6. The mobile terminal as claimed in claim 5,
  wherein the wireless system which is determined at said destination wireless system determining unit is one of a homogeneous system and a heterogeneous system.

7. A method of controlling handover in a system for controlling handover which comprises a mobile terminal that enables communication with a plurality of wireless systems having wireless access stations and an apparatus for controlling handover that executes control of the handover for said mobile terminal that travels among a plurality of types of the wireless systems, said apparatus for controlling handover connected to the wireless access stations via a plurality of connecting access routers, said method comprising:

receiving, at said mobile terminal, downlink signals from two or more wireless access station of the wireless access stations to determine which of corresponding wireless systems of the plurality of wireless systems accommodates a destination wireless access station based on reception quality of the received downlink signals;

sending, from said mobile terminal, information indicating said determined wireless system to said apparatus for controlling the handover;

controlling, by said apparatus, handover operations for said mobile terminal based on the information indicating said determined wireless system;

determining, by a router compatibility determination unit by referring to a database which manages corresponding relationships between said wireless access stations and said access routers, at a time the information indicating the wireless system which accommodates said destination wireless access station is reported, as to whether the access router which is connected to the destination wireless access station differs from the access router which is connected to a currently connecting wireless access station;

projecting, by a travelling speed projecting unit, a travelling speed of the mobile terminal based on received power characteristics of the downlink signals from the two or more wireless access stations; and sending, by a travelling speed information reporting unit, information indicating said projected travelling speed of said mobile terminal to the apparatus for controlling handover which executes control of handover for said mobile terminal travelling among the plurality of types of wireless systems.

\* \* \* \* \*